Patented Jan. 20, 1953

2,626,228

UNITED STATES PATENT OFFICE 2,626,228

METHOD OF PRODUCING CRYSTALLINE INSULIN

Karl Petersen, Copenhagen, Denmark, assignor to Novo Terapeutisk Laboratorium A/S, Copenhagen, Denmark No Drawing. Application July 31, 1947, Serial No. 765,271. In Denmark May 17, 1945

Section 1, Public Law 690, August 8, 1946
Patent expires May 17, 1965

3 Claims. (Cl. 167—75)

Insulin was first obtained in the crystalline form by Abel (1926). The crystallization was obtained from an ammonium acetate buffer to which great proportions of brucine and pyridine had been added and it was assumed that such medium should be particularly advantageous for obtaining a solution of insulin supersaturated at the isoelectric point of insulin, which enabled the crystals to form. It has later on been shown by Scott (1934) that the crystals of insulin could only be formed in the presence of certain metallic ions—zinc, nickel, cadmium or cobalt—and that these metallic ions could be found adjoint to the insulin in its crystalline form. These observations later on were further enlightened by Scott and Fischer, it being shown that a solution of insulin, which solution contained phosphate buffer, zinc chloride, ab. 10% of acetone and had been adjusted to pH 6.2 was particularly adapted for the crystallization of insulin.

On the other hand the use of a crystallization medium containing phosphate buffer and zinc chloride presents the drawback that the crystallization process when used in the actual manufacture of insulin not infrequently will be difficult to start or the yield will be unsatisfactory or the product will be of unsatisfactory quality. Moreover the ash content of the crystals obtained will usually be comparatively high as a result of the insolubility of the zinc phosphate and often they will contain some organic impurities. In order to obtain insulin crystals having lower ash contents and being of higher purity recrystallization will be necessary in most cases and for this purpose Scott and Fischer have proposed a crystallization medium containing ammonium acetate buffer. The recrystallization process will, however, reduce the yield in crystalline insulin.

The use of a buffer solution according to the works of the said investigators as well as in later papers on the crystallization of insulin appears to be caused only by the wish to have the pH of the solutions well fixed during crystallization.

It has now been found, however, that just as Scott was able to show that certain metallic ions form an integral part of the crystals of insulin, acid residues are also necessary for the formation of crystals and will contribute in building up the crystals.

In the known methods used for the crystallization of insulin, therefore, the buffer employed has played a part which has not yet been recognized, which part is that of delivering the anions necessary for crystallization. According to my investigations upon which the present invention is based the kind of acid residue has a deciding influence upon the power of crystallization and upon the composition of the crystals obtained, particularly when crystallization be used in real manufacture. It has been found that the presence of the citrate ion will influence crystallization much more favourably than the presence of any other anion.

According to the present invention, consequently, in the production of insulin by crystallization from a solution containing cations promoting crystallization, such as zinc ion I am conducting work in such a manner that crystallization will take place from a crystallization medium containing citrate ions.

By using such crystallization medium the defects mentioned above are obviated, the crystallization appearing spontaneously with formation of insulin crystals the contents of which in ashes, coloured organic impurities and certain impurities, which appear to have a glycogenolytic effect are less than in the methods of crystallization hitherto known.

With these general statements of the objects and purposes of my invention I will now proceed to describe the embodiment thereof and the manner in which my invention is carried out, and it will be understood that while I have described what may be considered as a preferable embodiment of my invention, I do not limit myself to the precise conditions or proportions herein set forth, as they may be varied by those skilled in the art in accordance with the particular purposes for which they are intended and the conditions under which they are to be utilized.

To 50 cm.$^3$ insulin solution containing about 1 g. insulin there is added 1 g. citric acid, 80 mg. chloride of zinc and 16 cm.$^3$ acetone, after which the solution is filled up with water to form a total volume of 100 cm.$^3$ and alkalized. When the solution is then adjusted to pH 6.10 spontaneous formation of crystals will occur. The solution is left to stand for a suitable period of time after which the crystals are removed and washed first with water and then with acetone whereafter they are dried in vacuum above sulphuric acid. The yield is 0.92 g. of insulin crystals, the activity of which amounts to 24 I. U. and the most important characteristics of which are:

| | Per cent |
|---|---|
| Contents of $H_2O$ | 3.4 |
| Contents of ashes | 1.1 |
| Contents of N | 14.73 |
| Contents of Zn | 0.38 |

It is favourable to use a solvent containing citric acid ions still before crystallization sets in and not only during crystallization, since the favourable influence of the presence of citric acid ions must necessarily be particularly marked at the beginning of crystallization. This rule deduced from the general idea underlying the invention has been made use of in the embodiment thereof above described.

What I claim is:

1. Process of producing purified insulin in crystalline form from impure insulin by crystallizing insulin from an impure solution thereof in the presence of citric acid ions and of crystallization-promoting cations selected from the group consisting of zinc, cadmium, nickel and cobalt at a pH to give spontaneous formation of crystals of insulin free from any substantial glycogenolytic effect.

2. The process of claim 1 in which the pH is approximately pH=6.1.

3. The process of claim 1 in which the pH is on the basic side of the isoelectric point of insulin.

KARL PETERSEN.

REFERENCES CITED

The following references are of record in the file of this patent:

UNITED STATES PATENTS

| Number | Name | Date |
|---|---|---|
| 2,143,590 | Scott | Jan. 10, 1939 |
| 2,174,862 | Sahyun | Oct. 3, 1939 |
| 2,192,386 | Sahyun | Mar. 5, 1940 |
| 2,537,757 | Hermann | Jan. 9, 1951 |

FOREIGN PATENTS

| Number | Country | Date |
|---|---|---|
| 492,095 | Great Britain | Sept. 9, 1938 |
| 860,963 | France | Oct. 15, 1940 |

OTHER REFERENCES

Lang in Pharmaceutical Archives, November 1941, volume 12, pages 81 to 87, page 87 relied on.